Oct. 11, 1955     E. T. MORTON     2,720,089
REFRIGERATOR TRAY AND BAFFLE

Filed Dec. 5, 1952     5 Sheets-Sheet 1

INVENTOR.
EVANS T. MORTON
BY
J. D. Douglas
HIS ATTORNEY

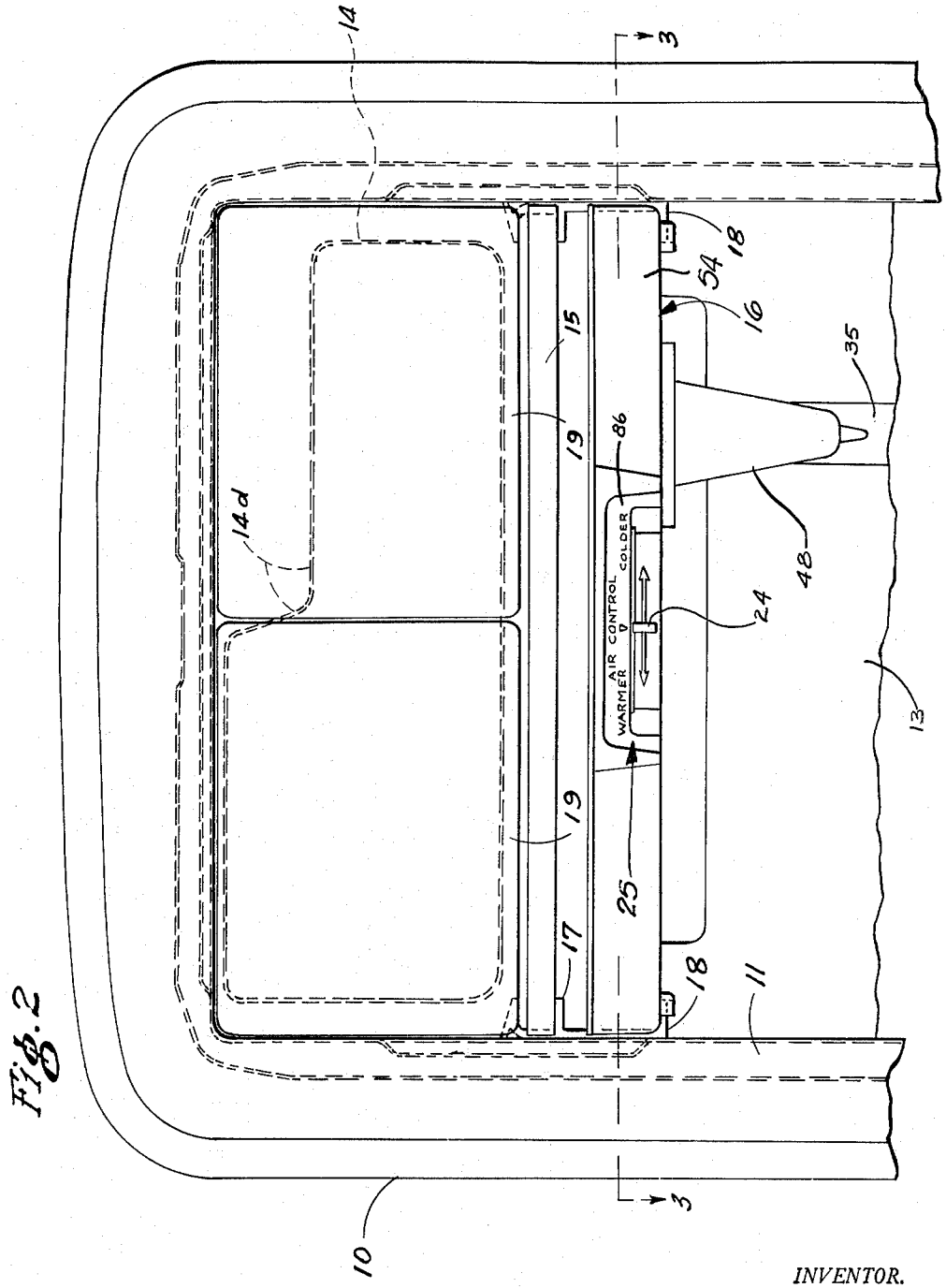

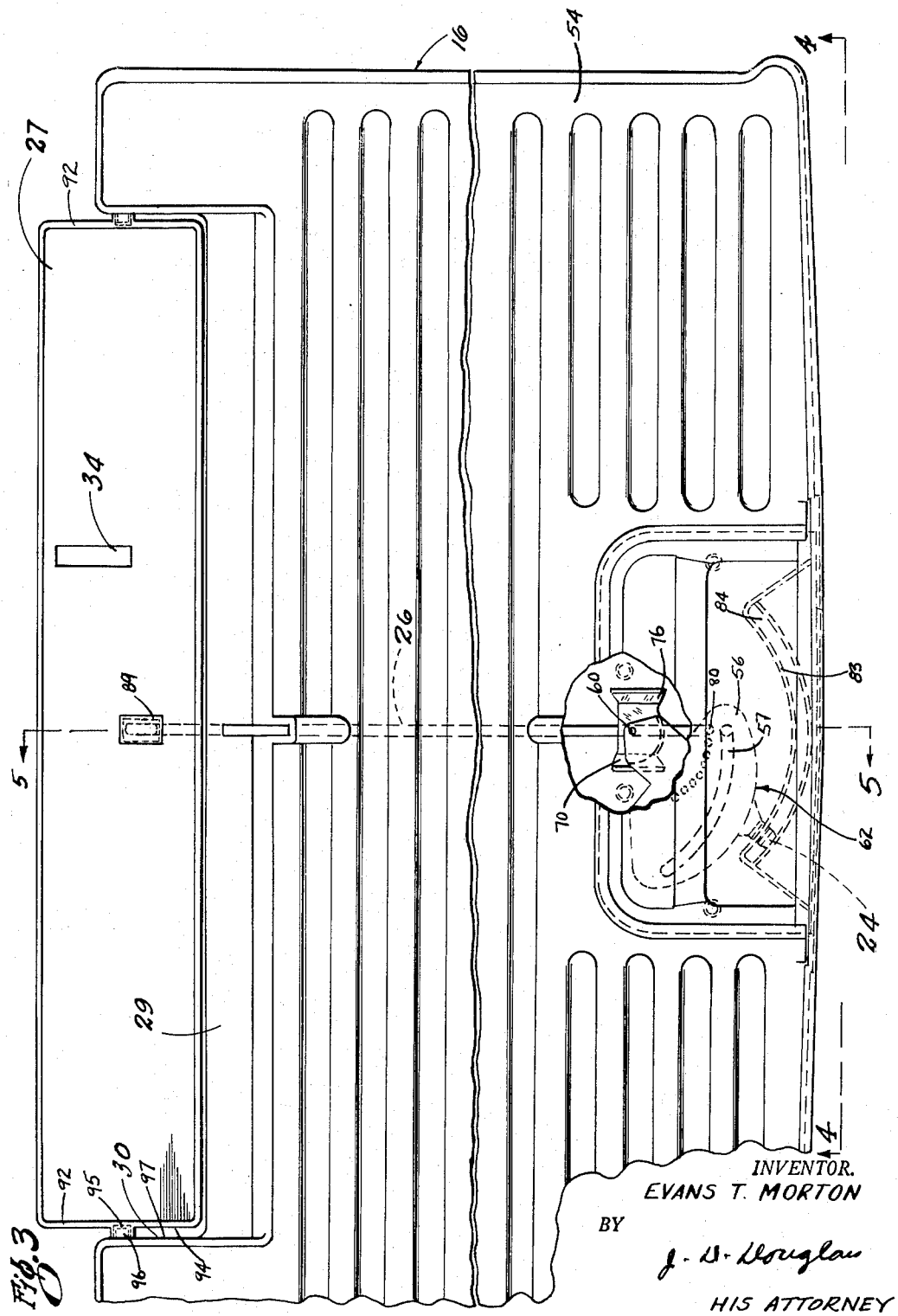

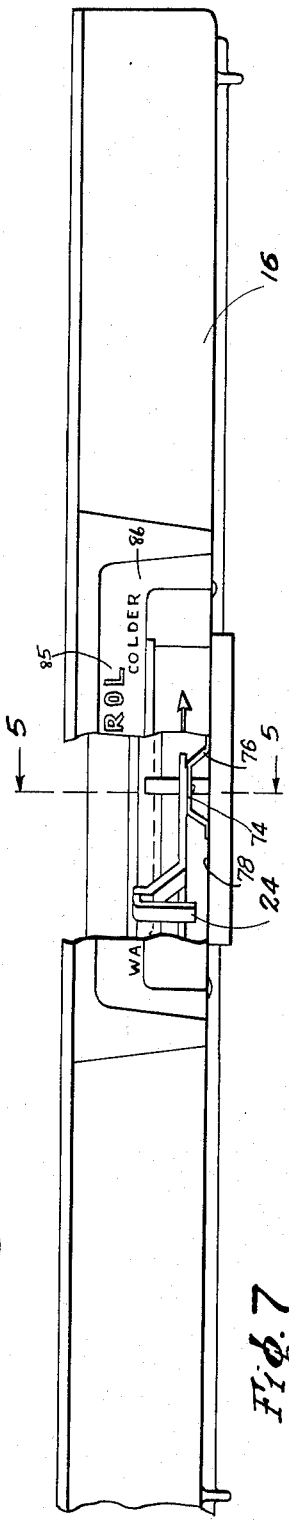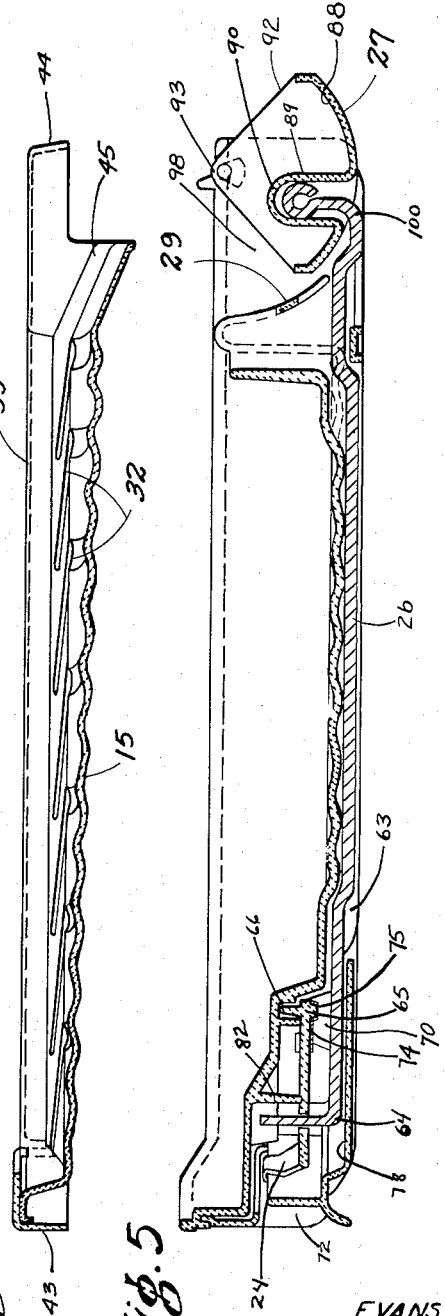

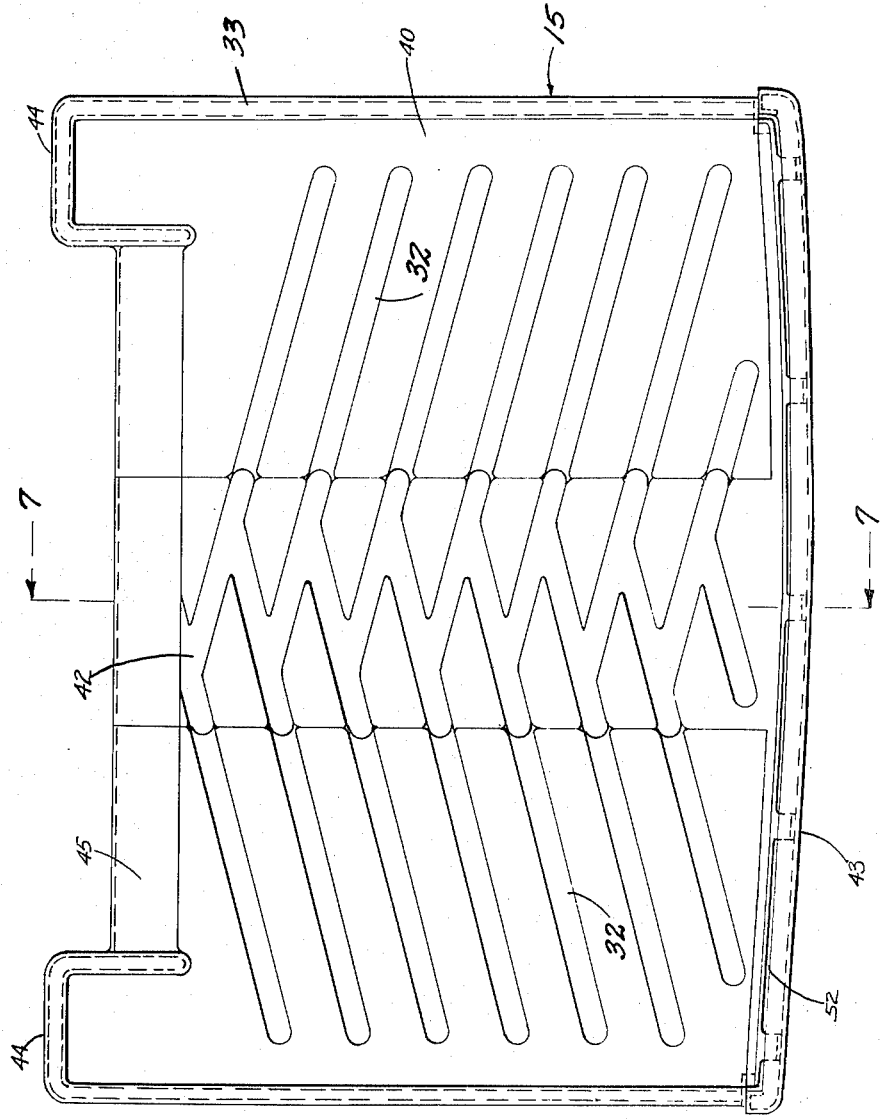

United States Patent Office 2,720,089
Patented Oct. 11, 1955

2,720,089

REFRIGERATOR TRAY AND BAFFLE

Evans T. Morton, Galesburg, Ill., assignor to The Admiral Corporation, Chicago, Ill., a corporation of Delaware Application December 5, 1952, Serial No. 324,296

8 Claims. (Cl. 62—103)

My invention relates to improvements in mechanical domestic refrigerators and more particularly to improved baffling means for controlling heat extraction rate in the so-called "food compartment" of a domestic refrigerator more or less independently of the pre-selected temperature of the "freezer" part thereof.

Heretofore, it has been known to have separate compartments in a mechanical refrigerator with one part providing storage at above freezing temperatures for the bulk of the produce to be stored therein, and another part providing storage at below freezing temperature as for ice cubes and frozen foods. In the past, a problem has arisen in that the control of temperature to achieve optimum condition for the so-called "freezer" chest has ofttimes resulted in too low a temperature for the above freezing portion of the machine, causing liquids and foods stored therein to freeze with well known deleterious effects thereon.

It is a purpose of the present invention to provide simple and inexpensive means for overcoming the above mentioned difficulties.

A further purpose of the present invention is to provide a novel combination of tray and freezer drawer allowing in a domestic mechanical refrigerator control of non-frozen food storage temperature substantially independent of freezer chest temperature, together with suitable run-off means for defrosting condensate and added storage facilities for frozen foods.

Other purposes and advantages will become apparent and the invention may be better understood from consideration of the following description taken in connection with the accompanying drawings in which:

Fig. 2 is an enlarged front elevational view of the top portion of the refrigerator of Fig. 1;

Fig. 3 is a fragmentary plan view of the freezer drawer;

Fig. 4 is an enlarged front elevation of a portion of the drawer 16 of Figs. 1–3, partly broken away to show a portion of the baffle operating means of the present invention;

Figure 1:
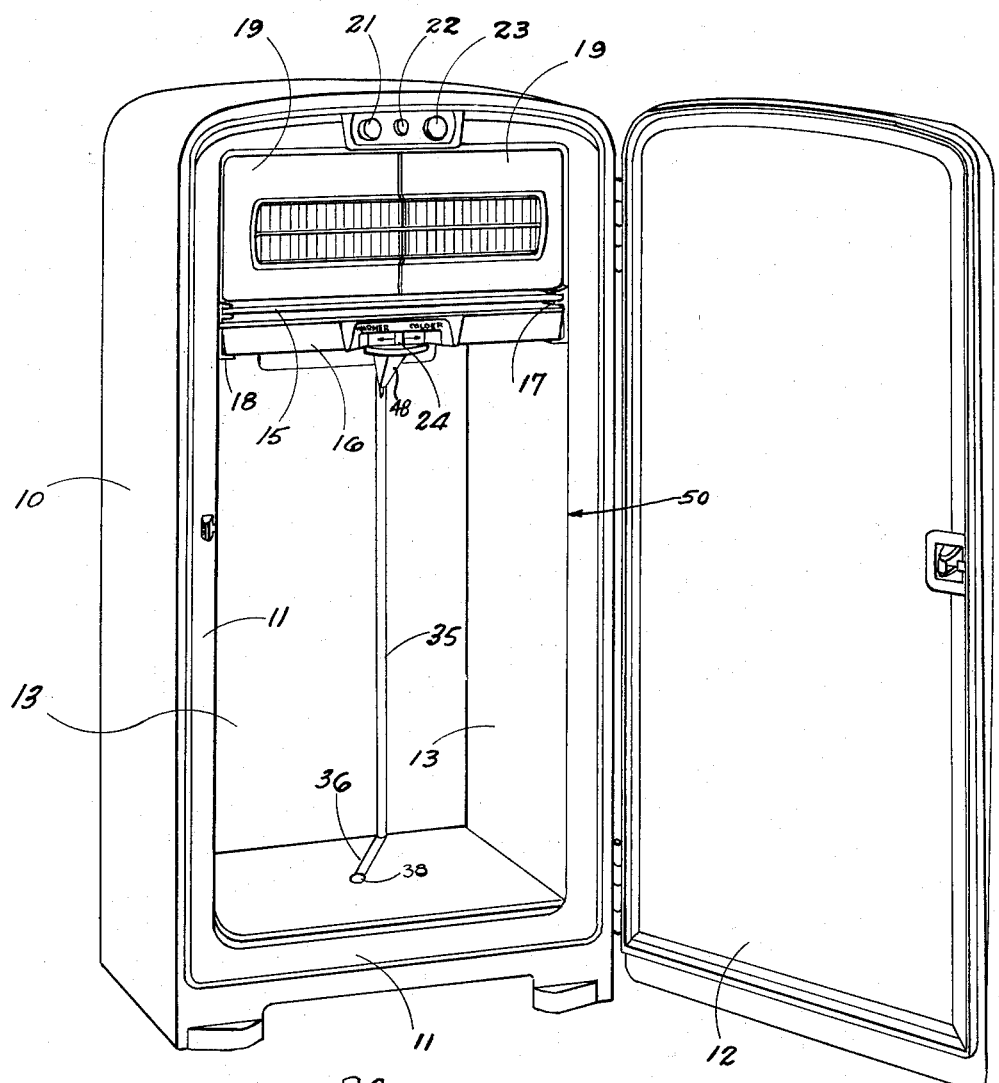
Fig. 1 is a perspective elevational view of a domestic mechanical refrigerator provided with the invention.

Fig. 5 is a sectional elevation of the drawer 16 taken along the center line 5—5 (of Figs. 3 and 4);

Fig. 6 is a plan view of the tray 15 shown in Figs. 1 and 2;

Fig. 7 is a cross sectional view taken on the line 7—7 of Fig. 6; and

Figure 8:
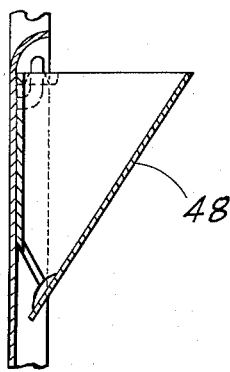

Fig. 8 is a cross sectional view of the funnel showing its location in the trough.

Referring to the drawings, there is shown a refrigerator having an outer wall or shell 10 to which is affixed a conventional front breaker strip 11 and outer door 12. In more or less conventional manner the outer shell 10 and front breaker strip 11 support an inner liner 13 with insulating material (not shown), interposed between the outer shell and the inner lever.

The inner liner defines a main chamber and, in accordance with conventional practice for modern mechanical types of domestic refrigerators, an evaporator unit 14 (see Fig. 2) is arranged across the top thereof. As shown in the drawing, the evaporator is provided with an upper quadrant offset 14d to provide room for ice cube trays, but this feature is entirely optional and forms no part of the present invention which is provided, instead, to provide improved baffle and separating means between an upper or freezer compartment (which contains the evaporator) and a lower non-frozen food storage compartment in the main chamber.

To this end, I provide a generally horizontal one piece tray 15, which may be fashioned of one of the so-called "plastic" materials, and below it, a generally horizontal food storage drawer 16, also of plastic.

The drawer 16 has integrally formed sides and front and back walls and operates on runners or rails 18 affixed to the sides of the inner liner. The tray 15 likewise has integrally formed walls and it operates on horizontal runners or rails 17, likewise affixed to the inner liner 13.

As hereinafter more fully explained, tray 15 and drawer 16 cooperate to provide for convection of water downwardly during "defrosting" and to prevent any great amount of gaseous convection between upper freezer compartment and lower non-frozen food storage compartment, which they define, and also to provide a measure of control of such convection and hence of the temperature of the lower compartment with respect to the upper. As shown in Fig. 1, the refrigerator is provided with usual doors 19 at the front of the freezer compartment, and with conventional control knobs 21–23 of which, for example, 21 may control freezer temperature, 22 may control defrosting action by being capable of being set to "Off," "On" or "Automatic," and 23 may control automatic defrost timing according to time of day or night desired for the automatic action.

In addition to the usual control (knob 21, as above described) for regulating the rate of heat abstraction and, hence, temperature for the "freezer" chest, in accordance with the present invention there is provided means for independently controlling the temperature of the lower non-frozen food compartment, the explanation of which is as follows:

The body of the tray 15, Figs. 6 and 7, has indented on its top surface 40, which slopes toward the back edge of the tray, lateral channels 32 of herringbone appearance starting near each side edge, and extending toward the center where they meet in a common channel 42. This common channel beginning near the front edge 43, and extending toward the back edge 44 terminates in a trough 45 which directs the flow of water created during the de-frosting cycle into a trough shaped baffle valve 27, Figs. 3 and 5, connected to the drawer 16 below, which in turn directs the flow into a funnel 48, Fig. 1, located immediately below the valve, and removably secured on the back inner wall of liner 13. The waste water then flows down a groove 35 in the back inner wall, the end of the funnel extending into the groove, and allowed to flow downward across a bottom channel 36 to an escape hole 38 where the waste water is allowed to drain off.

The tray 15 has a two-fold purpose, one being a means providing waste water to be drawn off during the defrosting cycle, and secondly the tray takes on the function of that of a baffle plate directing the cold air currents emanating from the evaporator 14 to the lower levels of the refrigerated area 50, Fig. 1.

The cold air currents are able to escape from the area between the evaporator 14 and the tray 15, Fig. 2, through slots 52, Fig. 6, which are formed in the front edge of the tray, and also through the trough 45 located on the back edge 44, Fig. 6, of the tray.

Located immediately below the tray is a drawer type structure 16, Figs. 2 and 3, having as its component parts an integrally formed body 54, Fig. 5, constructed of a suitable plastic, a baffle valve 27 also of plastic, a lever assembly 62, Fig. 3, and a front cover plate 25, Figs. 2 and 4.

The lever assembly 62, Fig. 3, includes a cam body 56 formed so that it contains an arcuate slot 57 which is radially more distant from the pivot point 60 at one end than at the other. The slot receives the end of a connecting rod 26 which extends below the drawer and held in position by suitable integral grooves 63 formed in the body of the drawer. One end of the connecting rod 26 is connected to the baffle valve 27, Fig. 5, and the other end being bent upward at 64, and extending through the arcuate slot 57 of the cam body 56. The construction of the cam body provides a pivot pin 65, Fig. 5, extending above and below the body. The upper portion of the pin is seated into a socket 66 provided for in the body of the drawer 54, and the lower portion being held resiliently in place by a metal bracket 70, explained in more detail hereinafter.

A pocket 72, Fig. 5, is formed on the underside of the front portion of the body of the drawer opening downwardly and to the front, providing suitable space for the reception of the cam body and its supporting structure. The lower portion of the pivot pin 65 is seated in the metal bracket 70 which includes a top face 74 having a hole 75 which receives the lower portion of the pivot pin 65, and legs 76, Fig. 3, extending downward and diverging outwardly. The legs 76 of the bracket 70 rest on the inside horizontal face 78 of the cover plate 25, which, when attached to the drawer by self-tapping screws, presses the bracket into resilient engagement with the cam body 56, and maintains its position in the socket 66.

The cam body is provided with a series of detents 80 equally spaced circumferentially about the pivot pin which come into contact with a detent pin 82 provided for in the pocket 72 in the body of the drawer. The metal bracket 70 not only provides pressure enabling the cam body 56 to be resiliently secured in the socket 66, but also holds the cam body resiliently against the detent pin 82 providing a plurality of selected positions to be realized.

The cover plate 25, Fig. 3, has on its front indented vertical face 83, a circular slot 84 of constant radius for the reception of the air control lever 24 of the cam body 56, the front indented vertical face 83 forming a circular quadrant and which functions as a guide wall for the air control lever 24, said lever extending up, through, and down the front of the guide wall. The upper face 86 on the front of the cover plate 25 includes a generally rectangular escutcheon 85 having the following printed words "Air Control, Warmer, Colder," which shows the relative position of the adjustable air control lever 24.

The baffle valve 27, constructed of a suitable plastic, includes a body having an elongated curved base 88, Fig. 5, a rectangular hole 34, Fig. 3, located within the base to enable the waste water to be drawn off at any setting of the baffle valve 27, a hollow finger shaped housing 89, Figs. 3, 5, having an opening on the underside of the base 88, and extending upward through the valve base, and being completely enclosed at the top of said housing 90, and arms 92 extending transversely and upward at each end from the curved base 88, closing off the ends of said curved valve base, and providing at the apex 93 of said arms on their respective outside surface 94, a socket 95, which receives a pivot pin 96, located on the vertical side wall 97 in the pocket 98, Fig. 4, so provided for on the rear edge of the drawer.

The connecting rod 26 bends upward at 100, Fig. 5, from the underside of the drawer, and is received by the hollow finger type housing 89 located on the baffle valve 27. The changing of the position of the air control lever 24 on the cam body 56 rotates the baffle valve 27 on the pivot pins 96 thereby distributing the flow of cold air to the area so desired.

There is thus provided a device of the character described capable of meeting the purposes above set forth. In operation the combination tray and storage drawer cooperate to provide additional and dry frozen food storage space, to permit adjustable throttling of convection which might otherwise lessen temperature in a non-frozen food storage compartment with respect to temperature desired in freezer chest, and the adjustment through a control lever which is right in the front portion of the refrigerator where it is easy to see and to operate, and yet the whole equipment adapts itself to quick and inexpensive manufacture. While a particular embodiment of this invention has been illustrated and described, modifications will obviously occur to those skilled in the art. It is therefore desired to be understood that the invention is not to be limited to the arrangement described, and that the appended claims cover all of the modifications which do not depart from the true spirit and scope of the invention.

I claim:

1. In a domestic mechanical refrigerator having an evaporator heat extraction unit in the top portion thereof, an impervious moisture baffle member arranged below said top portion, a storage drawer member arranged below said moisture baffle, both of said members extending horizontally through the interior of said refrigerator, and defining an upper freezing compartment and a lower non-frozen food storage compartment, a movable vane on one of said members for regulating convection therethrough, an opening adjacent said movable vane and in the other of said members for permitting convection therethrough, and moisture draining means for allowing moisture drainage through said members and through said vane substantially independent of the position of said vane.

2. In a domestic mechanical refrigerator having an inner liner in which is located an upper freezer chest, a lower non-frozen food storage chamber, adjustable controls for regulating cycle operation of said freezer chest, a combination baffling means for controlling convection of air between said upper freezer chest and lower non-frozen food storage chamber, said baffling means comprised of an upper generally flat tray, and a lower food storage drawer, adjacent openings on the back surfaces of said flat tray and food storage drawer to provide for a controlled convection of cold air, and said drawer being provided with adjustable throttling means for regulating the temperature in said non-frozen food chamber independently of the prevailing temperature in said freezer chest.

3. In a domestic mechanical refrigerator having an upper freezer chest, a lower non-frozen storage chamber, an adjustable baffling means, disposed between said freezer chest and said lower storage chamber, said baffling means comprised of an upper generally flat tray, and a lower food storage drawer, said drawer having confined within its structure adjustable throttling means comprised of a rotatably cam shaped body having an arcuate formed slot in said body, a connecting rod disposed in said slot, the opposite terminal of said rod being secured to a pivotally mounted baffle valve, to manually control the air currents emanating from said upper freezer chest to said lower non-frozen food storage chamber.

4. In a domestic mechanical refrigerator having an upper freezer chest, a lower non-frozen food storage chamber, disposed between said members an adjustable baffling means, slidable into and out of said lower chamber, comprised of an upper generally flat tray, and a lower food storage drawer, said tray having channels formed on the top surface thereof, said channels combining to form a central channel on said top surface, allowing liquid condensate from said freezer chest, gathering on said tray, to drain off; an upwardly convex baffle valve immediately below said rear edge of said tray, a rectangular opening in the base of said baffle valve, said rectangular opening enabling said collected condensate to drain off independently of the setting of said baffle valve, a funnel shaped member below said rectangular opening catching said condensate draining out of said baffle valve through said rectangular opening, a vertical rectangular groove located on the back wall of the inner liner, said groove extending from said funnel shaped member to the floor of said inner liner, a groove located in the floor of said inner liner connecting said vertical groove to a drainage outlet in the floor of said inner liner allowing condensate to escape to the exterior.

5. In a domestic mechanical refrigerator having an inner liner defining a main chamber, an evaporator unit arranged in the top of said main chamber to extract heat therefrom, a generally horizontal baffle having integrally formed sides and arranged to be slidable into and out of said main chamber below said evaporator unit and having a vertical opening in the back portion thereof and constructed and arranged to collect liquid from said evaporator and convey said liquid to said opening and therethrough, a generally horizontal food storage drawer having integrally formed sides and arranged to be slidable into and out of said main chamber below said baffle and having a vertical opening in the back thereof cooperating with the opening in said baffle when said baffle and said tray are in the innermost operating position, gaseous convection control means comprising a manually operable lever at the front of said tray, a vane hinged in the opening at the back of said tray, linking means connecting said lever and said vane, and liquid conduit means including an upwardly concave shaping of said vane to prevent spilling liquid therefrom at all operative positions thereof, an opening in said vane to allow the passage of liquid therethrough, a removable receptacle for collecting liquid at the bottom of said refrigerator, and conduit means connecting said opening in said vane and said removable receptacle.

6. In combination with a refrigerator having a wide evaporator at the top and a food storage space below the evaporator, a combination baffling means therefor including side rails disposed at the opposite sides of the cabinet below the evaporator, said rails formed with grooves extending from the front to the back of the cabinet, at least one of said rails being spaced from the evaporator, a baffle member juxtaposed to the evaporator and slidable in the grooves closest to the evaporator, and closing the space between the evaporator and the lower part of the cabinet, said baffle member being formed with a portion spaced from the back wall of the cabinet, which together with the back wall of the cabinet, forms a passage for air convection currents to flow therethrough, a food storage drawer slidably disposed in the grooves of said rails spaced from the evaporator and juxtaposed to said baffle member, and valve means in the back of said drawer opposite to said passageway, and control means on the front of said drawer connected to said valve means to control the position of said valve means and convection currents through said passageway.

7. In combination with a refrigerator having a wide evaporator at the top and a food storage space below the evaporator, a combination baffling means therefor including side rails disposed at the opposite sides of the cabinet below the evaporator, said rails formed with grooves extending from the front to the back of the cabinet, at least one of said rails being spaced from the evaporator, a baffle member juxtaposed to the evaporator and slidable in the grooves closest to the evaporator, and closing the space between the evaporator and the lower part of the cabinet, said baffle member being formed with a portion spaced from the back wall of the cabinet, which together with the back wall of the cabinet, forms a passage for air convection currents to flow therethrough, a food storage drawer slidably disposed in the grooves of said rails spaced from the evaporator and juxtaposed to said baffle member, and valve means in the back of said drawer opposite to said passageway, and control means on the front of said drawer connected to said valve means to control the position of said valve means and convection currents through said passageway, said drawer being formed with a downwardly and forwardly opening pocket in the front thereof, said control means being seated in said pocket, an escutcheon and cover plate closing said pocket and resilient means interposed between said plate and said control means to hold said control means in position.

8. In combination with a refrigerator having a wide evaporator at the top and a food storage space below the evaporator, a combination baffling means therefor including side rails disposed at the opposite sides of the cabinet below the evaporator, said rails formed with grooves extending from the front to the back of the cabinet, at least one of said rails being spaced from the evaporator, a baffle member juxtaposed to the evaporator and slidable in the grooves closest to the evaporator, and closing the space between the evaporator and the lower part of the cabinet, said baffle member being formed with a portion spaced from the back wall of the cabinet, which together with the back wall of the cabinet, forms a passage for air convection currents to flow therethrough, a food storage drawer slidably disposed in the rails spaced from the evaporator and juxtaposed to said baffle member and being formed with a passageway coincident to that of the baffle member, and valve means in said passageway, and control means on the front of said drawer connected to said valve means to control the position of said valve means and convection currents through said passageway, said drawer being formed with a downwardly and forwardly opening pocket in the front thereof, said control means being seated in said pocket, an escutcheon and cover plate closing said pocket and resilient means interposed between said plate and said control means to hold said control means in position, and a connector rod connecting said control means to said valve, said control means including an indicator and indicating indicia on said escutcheon cooperating with said indicator to determine the amount of opening of the valve.

References Cited in the file of this patent

UNITED STATES PATENTS

| | | |
|---|---|---|
| 2,292,032 | Atchison | Aug. 4, 1942 |
| 2,562,057 | Norberg | July 24, 1951 |
| 2,600,297 | Janos | June 10, 1952 |
| 2,627,729 | Philipp | Feb. 10, 1953 |